US012526254B1

(12) United States Patent
Parisio et al.

(10) Patent No.: US 12,526,254 B1
(45) Date of Patent: Jan. 13, 2026

(54) DYNAMIC DOMAIN NAME SECURITY POLICY ENFORCEMENT

(71) Applicant: Amazon Technologies, Inc., Seattle, WA (US)

(72) Inventors: Andrew Parisio, Bellevue, WA (US); Andrew Paul Junquet, Lexington, SC (US); Craig Hagan, Brookline, MA (US); David Liddell, Miami, FL (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 17/892,505

(22) Filed: Aug. 22, 2022

(51) Int. Cl.
*H04L 9/40* (2022.01)
*H04L 61/4511* (2022.01)

(52) U.S. Cl.
CPC ...... *H04L 63/0236* (2013.01); *H04L 61/4511* (2022.05); *H04L 63/0263* (2013.01); *H04L 63/101* (2013.01)

(58) Field of Classification Search
CPC ............. H04L 63/0236; H04L 63/0263; H04L 63/101; H04L 61/45; H04L 61/4552; H04L 51/5007; H04L 61/58; H04L 63/00; H04L 63/02
See application file for complete search history.

(56) References Cited

U.S. PATENT DOCUMENTS

| | | | | |
|---|---|---|---|---|
| 11,552,948 | B1* | 1/2023 | Peterson | H04L 63/0876 |
| 2011/0010463 | A1* | 1/2011 | Christenson | H04L 61/4511 |
| | | | | 709/245 |
| 2012/0084423 | A1* | 4/2012 | McGleenon | H04L 61/4511 |
| | | | | 709/223 |
| 2012/0311693 | A1* | 12/2012 | Horman | H04L 63/0263 |
| | | | | 726/14 |
| 2014/0019601 | A1* | 1/2014 | Blacka | H04L 63/10 |
| | | | | 709/223 |

(Continued)

OTHER PUBLICATIONS

T. Otsuka, Gada, N. Yamai, K. Okayama and Y. Jin, "Design and Implementation of Client IP Notification Feature on DNS for Proactive Firewall System," 2015 IEEE 39th Annual Computer Software and Applications Conference, Taichung, Taiwan, 2015, pp. 127-132, doi: 10.1109/COMPSAC.2015.220. (Year: 2015).*

(Continued)

*Primary Examiner* — Patrice L Winder
(74) *Attorney, Agent, or Firm* — Kilpatrick Townsend & Stockton LLP

(57) ABSTRACT

Systems and methods described herein provide for novel security policy features network devices. In embodiments, a first domain name system (DNS) request for a resource may be obtained by a first computer system associated with a firewall. The first DNS request may be between a second computer system and a DNS server and include a domain name for the resource. A determination may be made that the domain name included in the first DNS request is included in an access control list maintained by the first computer system. A first DNS response from the DNS server may be received by the first computer system and include an internet protocol (IP) address for the resource. The access control list may be updated to include the IP address for the domain name for the resource. The IP address may be transmitted to the second computer system by the first computer system.

20 Claims, 9 Drawing Sheets

(56) References Cited

U.S. PATENT DOCUMENTS

| | | | |
|---|---|---|---|
| 2015/0012664 A1* | 1/2015 | Johnson | H04L 45/72 709/238 |
| 2016/0094480 A1* | 3/2016 | Kulkarni | H04L 47/2441 370/230 |
| 2017/0111313 A1* | 4/2017 | Lear | H04L 61/4511 |
| 2018/0124016 A1* | 5/2018 | Ong | H04L 63/0236 |
| 2019/0253385 A1* | 8/2019 | Gurney | H04L 63/0263 |
| 2020/0228486 A1* | 7/2020 | Park | H04L 61/4511 |
| 2020/0351270 A1* | 11/2020 | Burton | H04L 61/4511 |
| 2022/0286431 A1* | 9/2022 | Winn | H04L 63/20 |

OTHER PUBLICATIONS

Cisco Systems, Inc. "Security Configuration Guide, Cisco IOS XE Bengaluru 17.6.x (Catalyst 9300 Switches)", 756 pages, published Jul. 31, 2021.

* cited by examiner

DYNAMIC DOMAIN NAME SECURITY POLICY ENFORCEMENT

BACKGROUND

Conventional machine controller systems are configured to continuously monitor the state of various components and make decisions using custom or vendor-specific programming to control the state of the various components. As the machine controller systems provide continual operations, network communications to specific resources must be accurately maintained as any interruption in the services provided by associated electromechanical devices could be dangerous or costly to a corresponding facility. Compounding the problem is the fact that the resources communicated with by the machine control systems may be migrated to new servers or locations periodically or at random (e.g., based on a server update or server outage). Additionally, bad actors can introduce devices which can attempt to introduce malware, spyware, or other destructive software/viruses which can attempt to gain access to resources of a facility via available networks. Thus, loses in time and man power can result when network resources are not properly protected and devices are allowed to connect to other resources not required for performing intended operations.

BRIEF DESCRIPTION OF THE DRAWINGS

Various embodiments in accordance with the present disclosure will be described with reference to the drawings, in which.

DETAILED DESCRIPTION

Figure 1A:
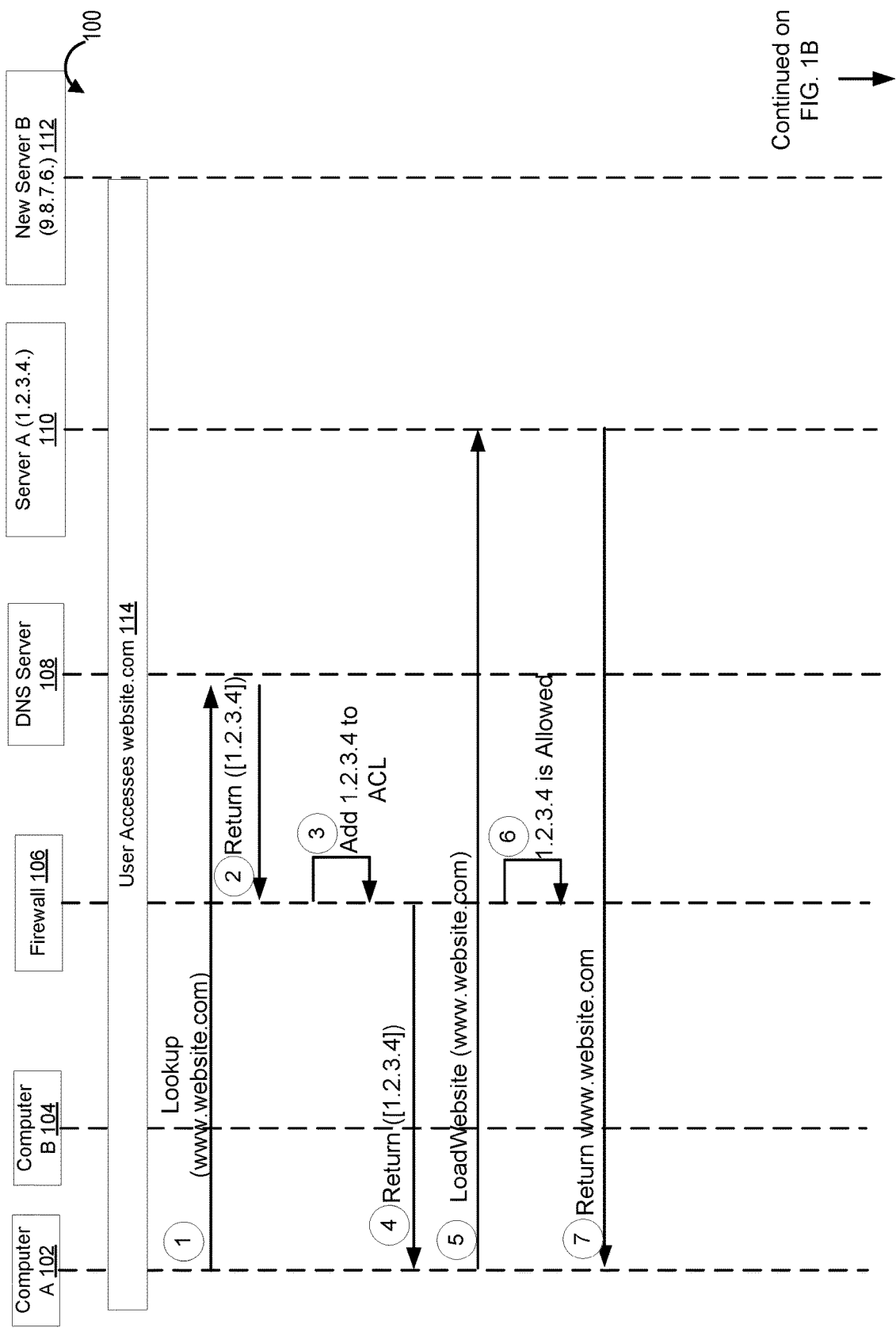
FIG. 1A illustrates an example swim lane diagram between computer systems and network devices for security policy features, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide for implementation of a security policy feature that efficiently and securely restricts access by computer systems to certain resources without impacting usage of the computer systems to perform operations. The security policy features described herein provide a solution to convention security policy features which are not able to restrict and allow access to network resources at a granular level. Static or delayed updates utilized by conventional security policy features results in denied access requests in situations where a computer system should be able to access a resource or compromised network architectures as devices are allowed unfettered access. Conventional security policy features may attempt to cache internet protocol (IP) addresses for a domain name or resource locator in order to allow access to only the cached IP addresses and deny all other requests. However, some resources are associated with hundreds of IP addresses resulting in delayed processing of access requests. Moreover, responses to such requests which are provided to domain name system (DNS) severs may include only one or a portion of IP addresses associated with a particular domain name or resource locator. Additionally, even if all current IP addresses are returned by a DNS server and cached according to a conventional security policy feature, servers may update their IP addresses for a number of reasons, such as a power outage, failover, scaling, load balancing, etc. In such situations until the firewall or other network security hardware/software updates its maintained cache, requests to an associated resource would be denied as the requesting systems would utilize older information.

Service provider computers implementing a firewall and the security policy features described herein provide a solution for the above described problems created by conventional security policy features and methods. In embodiments, a firewall can obtain, inspect, or otherwise receive DNS requests between computer systems and a resource and update a maintained access control list with returned IP addresses. The access control list can include rules for specifying domain name allowances and restrictions. For example, the firewall may implement a rule such as "Access-list permit host hostname.domain.com," to allow requests to the hostname.domain.com to be allowed. The firewall may implement another rule for restricting access to any other resource by implementing a rule such as "Access-list deny IP any/any." It should be noted that the security policy features described herein include utilizing domain name restrictions or rules which use wild car designations or specific domain name designations. Such network security allowance and restriction rules may be desired by various entities such as warehouses or facilities which implement a number of programmable logic controllers, machine controllers, machine handling equipment, and electromechanical devices. Facilities and warehouses may wish to restrict such computer systems to only accessing resources which are required by such computer systems to perform intended operations. For example, a programmable logic controller associated with one or more conveyor belt electromechanical devices would have no need to communicate with autonomous mobile robot devices moving inventory throughout a facility. However, leaving open such potential communication requests between the programmable logic controller and the autonomous mobile robot can lead to security breaches and unintended communication issues which result in down time for the computer systems which impact intended operations of such systems. In embodiments, the firewall described herein comprises a network firewall.

In accordance with at least one embodiment, the firewall can determine that the DNS request is for a domain name that is allowed by the firewall for access by the computer system by comparing the received domain name of the DNS request to its maintained access control list. In embodiments the firewall can receive a DNS response from the DNS server which includes an IP address for the domain associated with the resource. The firewall can then update the ACL to include the IP address of the DNS response and transmit the IP address to the requesting computer system. Updates by a server to new IP addresses will not impact requests made by computer systems as the firewall dynamically updates the ACL via the use of inspecting or otherwise obtaining DNS requests and responses between computer systems and DNS servers. For example, assume the above described resource is migrated to a new server with an IP address (updated IP address) that is different than the IP address returned and cached by the firewall in its associated access control list.

The security policy features described herein would provide for the firewall receiving a subsequent request to the resource using the allowed domain name. The firewall would determine that the request to the domain is allowed by comparing the domain name of the request to the allowed domain names of the access control list. The firewall would then receive the updated IP address from the DNS server and update the access control list to associate the updated IP address with the domain name of the access control list. The updated IP address would then be transmitted to the requesting computer system. A subsequent load or access request to the resource, which has migrated to a new server with a different IP address, would then be allowed by the firewall as it had already updated the access control list using the DNS response. However, conventional security policy features would deny such a request as the firewall would not be updated with the IP address. Conventional methods would require a firewall to refresh its cache which can take minutes or hours. In such a time period all requests to an allowed domain name would be denied as the requesting computer systems would be utilizing old information or new IP addresses which have not been added to the cache of the firewall.

In accordance with at least one embodiment, the security policy features described herein include the firewall acting as a relay server to prevent man-in-the-middle attacks by fraudulent actors. For example, the firewalls implementing the security policy features may receive, directly, DNS requests from computer systems attempting to communicate with a resource of an associated network. The firewall may authenticate with a particular DNS server and only upon proper authentication, transmit a DNS request and receive a DNS response from the trusted DNS server. Using such features prevents fraudulent actors from intercepting communications between computer systems of a network and various DNS servers. In such embodiments, the firewall can still inspect the DNS request and response to compare the information to the associated access control list and dynamically update the access control list with new IP addresses for a domain name or resource locator that is allowed. In accordance with at least one embodiment, the service provider computers associated with the firewall may also maintain a number of rules or policies which assign priorities to certain domain names which result in using certain ports or network paths thereby processing certain requests by computer systems for certain resources more efficiently then requests for other resources of an associated network.

FIG. 1A illustrates an example swim lane diagram 100 between computer systems and network devices for security policy features, in accordance with at least one embodiment. The swim lane diagram 100 includes computer A 102, computer B 104, firewall 106, DNS server 108, server A 110, and new server B 112. The swim lane diagram 100 of FIG. 1A includes the above described devices (102-112) communicating via a network. In FIG. 1A, the example computer systems 102 and 104 are attempting to access a web site ("www.website.com") in a network architecture that includes firewall 106 and DNS server 108. The firewall 106 represented in FIG. 1A may implement the security policy features described herein. In embodiments, the firewall 106 may be integrated, incorporated, implemented, or associated with service provider computers or a computer system that also implements the security policy features described herein including dynamically updating an associated access control list. The swim lane diagram 100 of FIG. 1A includes a user (not pictured) using computer A 102 to access a web site 114 such as "www.website.com" at step 1.

To perform such an access request to a resource such as "www.website.com," computer A 102 may transmit a look up request to DNS server 108 to obtain the IP address associated with the domain name "www.website.com." As illustrated in FIG. 1A, server A 110 located at IP address 1.2.3.4. currently hosts or otherwise maintains "www.website.com." The security policy features implemented by firewall 106 include the firewall 106 making a determination that "www.website.com" is included in a maintained access control list. The firewall 106 can make such a determination by comparing the received domain name "www.website.com" to a list of approved or allowed domain names of the access control list maintained by firewall 106. In embodiments, if the domain name obtained or inspected by firewall 106 in route to DNS server 108 is not included in the access control list, the firewall 106 may deny the lookup request at step 1. If the domain name of the request at step 1 is included in the access control list then the request is forwarded to the DNS server 108 which returns an IP address associated with the domain name of the request at step 2 (e.g., returns 1.2.3.4 as the IP address for server A 110).

The swim lane diagram 100 includes the firewall 106 adding or updating the maintained access control list to include IP address 1.2.3.4 for the domain name "www.website.com" at step 3. In embodiments, the DNS server 108 returns the IP address 1.2.3.4 as well as a time to live (TTL) time period associated with the IP address to the firewall 106. In accordance with at least one embodiment, the firewall 106 may update the access control list with the TTL time period and use the TTL time period to purge or expunge the IP address 1.2.3.4 from the access control list upon expiration of the TTL time period. The firewall 106 then returns the IP address to computer A 102 in a DNS response at step 4 of the swim lane diagram 100. In embodiments, the firewall 106 also provides the TTL time period associated with the IP address 1.2.3.4 to computer A 102. Computer systems, such as computer A 102 and computer B 104 may be configured to add the returned IP address (1.2.3.4) and the TTL time period to a local DNS cache. The computer systems A 102 and B 104 may be configured to purge or expunge the IP addresses provided by firewall 106 upon expiration of the TTL time period. In such cases, the computer systems A 102 and B 104 may transmit new DNS requests for accessing the same resource as previously requested (e.g., for www.website.com). In response to computer A 102 receiving an IP address for the requested domain name, the computer A 102 may transmit a load or access request to the server that is located at the IP address at step 5. For example, as illustrated in FIG. 1A, the computer A 102 may transmit a load website request for "www.website.com" by communicating with server A 110 using the IP address "1.2.3.4." As part of the load or access request the firewall 106 may inspect the request to ensure that the IP address and domain name of the load and access request match the IP address and domain name of an associated access control list at step 6. As indicated above, the firewall 106 has added IP address 1.2.3.4 to its access control list for the domain name "www.website.com" so the request is allowed at step 6. The process of swim lane diagram 100 of FIG. 1A may conclude with the server A 110 returning the assets or other data objects for "www.website.com" to computer A 102.

The security policy features described herein and with reference to FIG. 1A include the firewall 106 updating an associated access control list based on the observed DNS requests and responses between devices of an associated network or network architecture. The benefits of this can be seen with reference to FIG. 1B in which server A 110 which hosts or otherwise provides access to "www.website.com" is migrated to new server B 112 at 116. The process of swim lane diagram 100 if FIGS. 1A and 1B includes, at step 8, a different computer, computer B 104 requesting (making a DNS request) for "www.website.com." As above with reference to FIG. 1A, the firewall 106 inspects, obtains, or otherwise has access to the DNS request between computer B 104 and DNS server 108. The firewall 106 may determine that the domain name of the DNS request between computer B 104 and DNS sever 108 is allowed by comparing it to the access control list maintained by firewall 106. Assuming it is allowed, the process at step 9, includes the DNS server 108 returning a different IP address ("9.8.7.6") for the domain name "www.website.com" to firewall 106 as the resource has been migrated from server A 110 (IP address 1.2.3.4) to new Server B 112 (IP address 9.8.7.6).

Figure 1B:
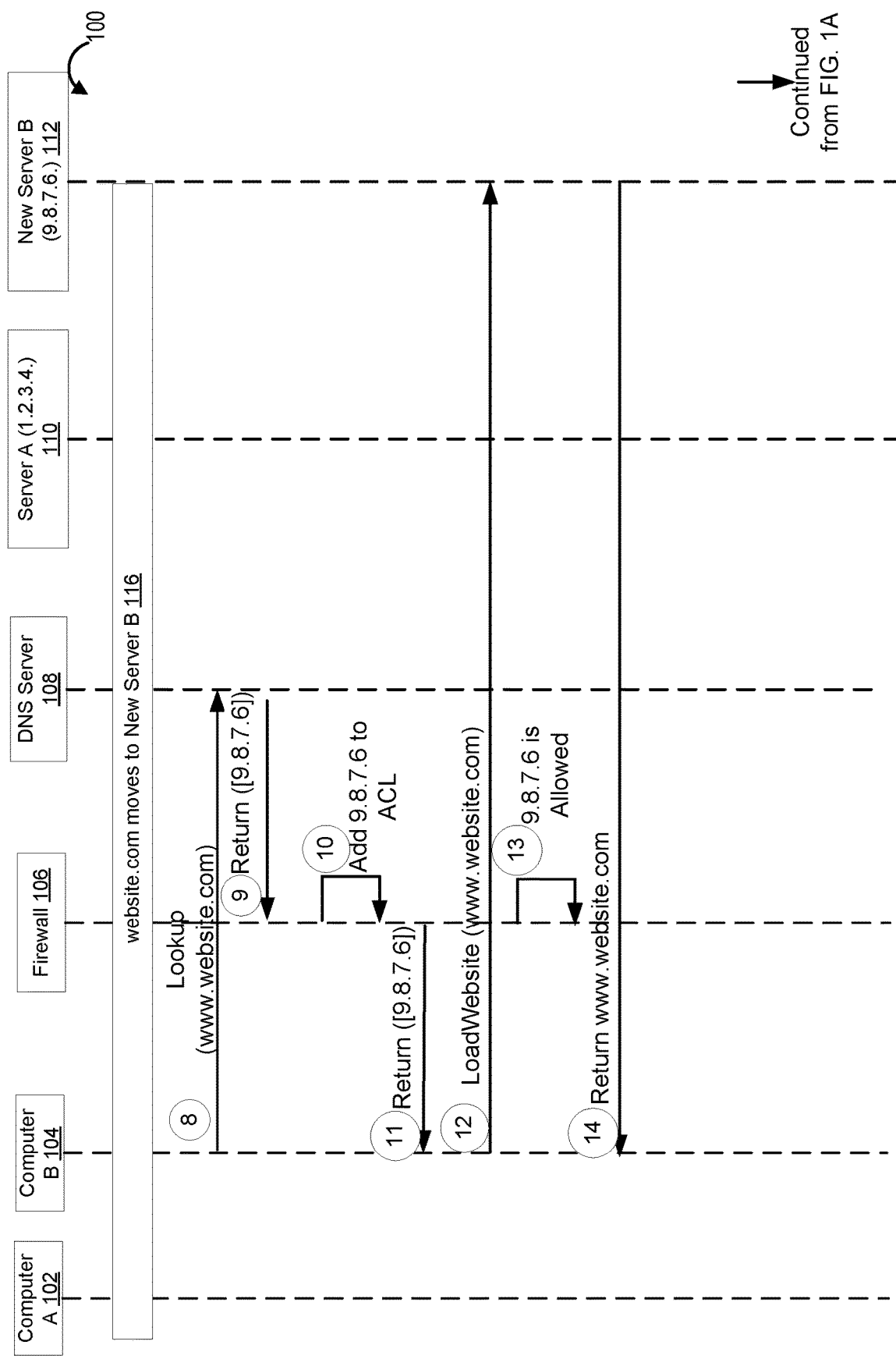
FIG. 1B illustrates an example swim lane diagram between computer systems and network devices for security policy features, in accordance with at least one embodiment.

The process of FIG. 1B includes, at step 10, the firewall 106 adding or otherwise updating the associated access control list to include or associate the IP address "9.8.7.6" with an approved IP address for the domain name "www.website.com." Swim lane diagram 100 of FIG. 1B depicts the firewall 106 transmitting a DNS response which includes the IP address "9.8.7.6" to computer B 104 at step 11. As computer B 104 has the IP address for the resource hosted by new server B 112, the process of FIG. 1B includes at step 12 computer B requesting access to "www.website.com" via a load or access request transmitted to new server B 112. This request at step 12 is obtained, accessed, or otherwise analyzed by firewall 106 at step 13 which determines that IP address "9.8.7.6" is included in the updated access control list and as such the request should be allowed or permitted to be transmitted to new server B 112. At step 14 the new server B 112 may return the web site or data objects for loading the web site "www.website.com." As illustrated by FIGS. 1A and 1B, the security policy features provide a solution for dynamically updating an access control list of a firewall by inspecting DNS requests and responses between devices of a network architecture. By updating the access control list the firewall can still allow requests to the resource associated with "www.website.com" despite migration between server A 110 and new server B 112 without having to make a separate cache update request to the DNS server 108 or the servers 110 or 112. Instead, the firewall 106 may actively update the associated access control list based on the inspected requests and responses which results in less down time for devices seeking to access the resource "www.website.com" even in situations where the resource is relocated.

Figure 2A:
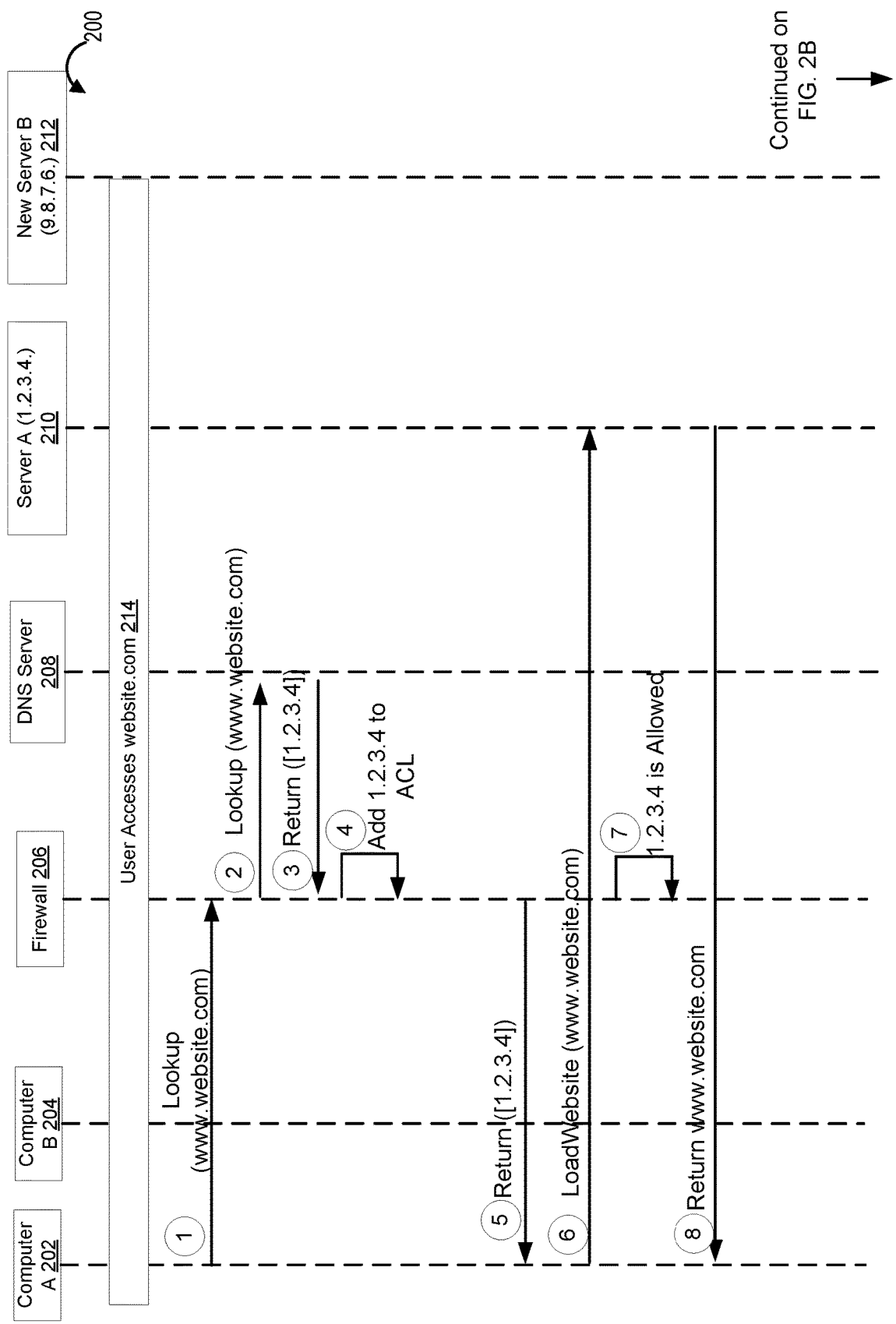
FIG. 2A illustrates an example swim lane diagram between computer systems and network devices for security policy features, in accordance with at least one embodiment.

FIG. 2A illustrates an example swim lane diagram 200 between computer systems and network devices for security policy features, in accordance with at least one embodiment. The swim lane diagram 200 includes computer A 202, computer B 204, firewall 206, DNS server 208, server A 210, and new server B 212. The swim lane diagram 200 of FIG. 2A includes the above described devices (202-212) communicating via a network. In FIG. 2A, the example computer systems 202 and 204 are attempting to access a web site ("www.website.com") in a network architecture that includes firewall 206 and DNS server 208. The firewall 106 represented in FIG. 2A may implement the security policy features described herein. In embodiments, the firewall 206 may be integrated, incorporated, implemented, or associated with service provider computers or a computer system that also implements the security policy features described herein including dynamically updating an associated access control list by acting as a relay server. The firewall 206 of FIGS. 2A and 2B actively receive and process the DNS requests between computer systems 202 and 204 and DNS server 208 instead of observing or access the DNS requests as described above with reference to FIGS. 1A and 1B. The swim lane diagram 200 of FIG. 2A includes a user (not pictured) using computer A 202 to access a web site 214 such as "www.website.com" at step 1.

To perform such an access request to a resource such as "www.website.com," computer A 202 may transmit a look up request (DNS request) to firewall 206 to obtain the IP address associated with the domain name "www.website.com" on behalf of computer A 202. The firewall 206 of FIG. 2A may perform the look up request or DNS request by communicating with the DNS server 208 directly on behalf of the computer A 202. As illustrated in FIG. 2A, server A 210 located at IP address 1.2.3.4. currently hosts or otherwise maintains "www.website.com." The security policy features implemented by firewall 206 include the firewall 206 making a determination that "www.website.com" is included in a maintained access control list. The firewall 206 can make such a determination by comparing the received domain name "www.website.com" to a list of approved or allowed domain names of the access control list maintained by firewall 206. In embodiments, if the domain name is not included in the access control list, the firewall 206 may deny the lookup request at step 1. If the domain name of the request at step 1 is included in the access control list then the firewall 206 may transmit the DNS request to DNS server 208 on behalf of computer A 202 at step 2. The swim lane diagram 200 includes, at step 3, DNS server 208 returning, to firewall 206, an IP address associated with the domain name of the request at step 2 (e.g., returns 1.2.3.4 as the IP address for server A 210).

The swim lane diagram 200 includes the firewall 206 adding or updating the maintained access control list to include IP address 1.2.3.4 for the domain name "www.website.com" at step 4. The firewall 206 then returns the IP address to computer A 102 in a DNS response at step 5 of the swim lane diagram 200. In response to computer A 102 receiving an IP address for the requested domain name, the computer A 102 may transmit a load or access request to the server (server A 210) that is located at the IP address at step 6. For example, as illustrated in FIG. 2A, the computer A 102 may transmit a load website request for "www.website.com" by communicating with server A 110 using the IP address "1.2.3.4." As part of the load or access request the firewall 206 may inspect the request to ensure that the IP address and domain name of the load and access request match the IP address and domain name of an associated access control list at step 7. As indicated above, the firewall 206 has added IP address 1.2.3.4 to its access control list for the domain name "www.website.com" so the request is allowed at step 7. The process of swim lane diagram 200 of FIG. 2A may conclude with the server A 210 returning the assets or other data objects for "www.website.com" to computer A 202.

The security policy features described herein and with reference to FIG. 2A include the firewall 206 updating an associated access control list based on the received DNS requests and responses acting as a relay server between devices of an associated network or network architecture. The benefits of this can be seen with reference to FIG. 2B in which server A 210 which hosts or otherwise provides access to "www.website.com" is migrated to new server B 212 at 216. The process of swim lane diagram 200 if FIGS. 2A and 2B includes, at step 9, a different computer, computer B 204 requesting (making a DNS request) for "www.website.com." As above with reference to FIG. 2A, the firewall 206 receives the DNS request between computer B 204 and relays or otherwise processes the DNS request on behalf of computer B 204 by communicating directly with DNS server 208. The firewall 206 may determine that the domain name of the DNS request from computer B 104 is allowed by comparing it to the access control list maintained by firewall 206. In response to determining that it allowed, the firewall 206 may transmit the look up request (DNS request) at step 10 to DNS server 208 for requesting an IP address for domain name "www.website.com." The process at step 11, includes the DNS server 208 returning a different IP address ("9.8.7.6") for the domain name "www.website.com" to firewall 206 as the resource has been migrated from server A 210 (IP address 1.2.3.4) to new Server B 212 (IP address 9.8.7.6).

Figure 2B:
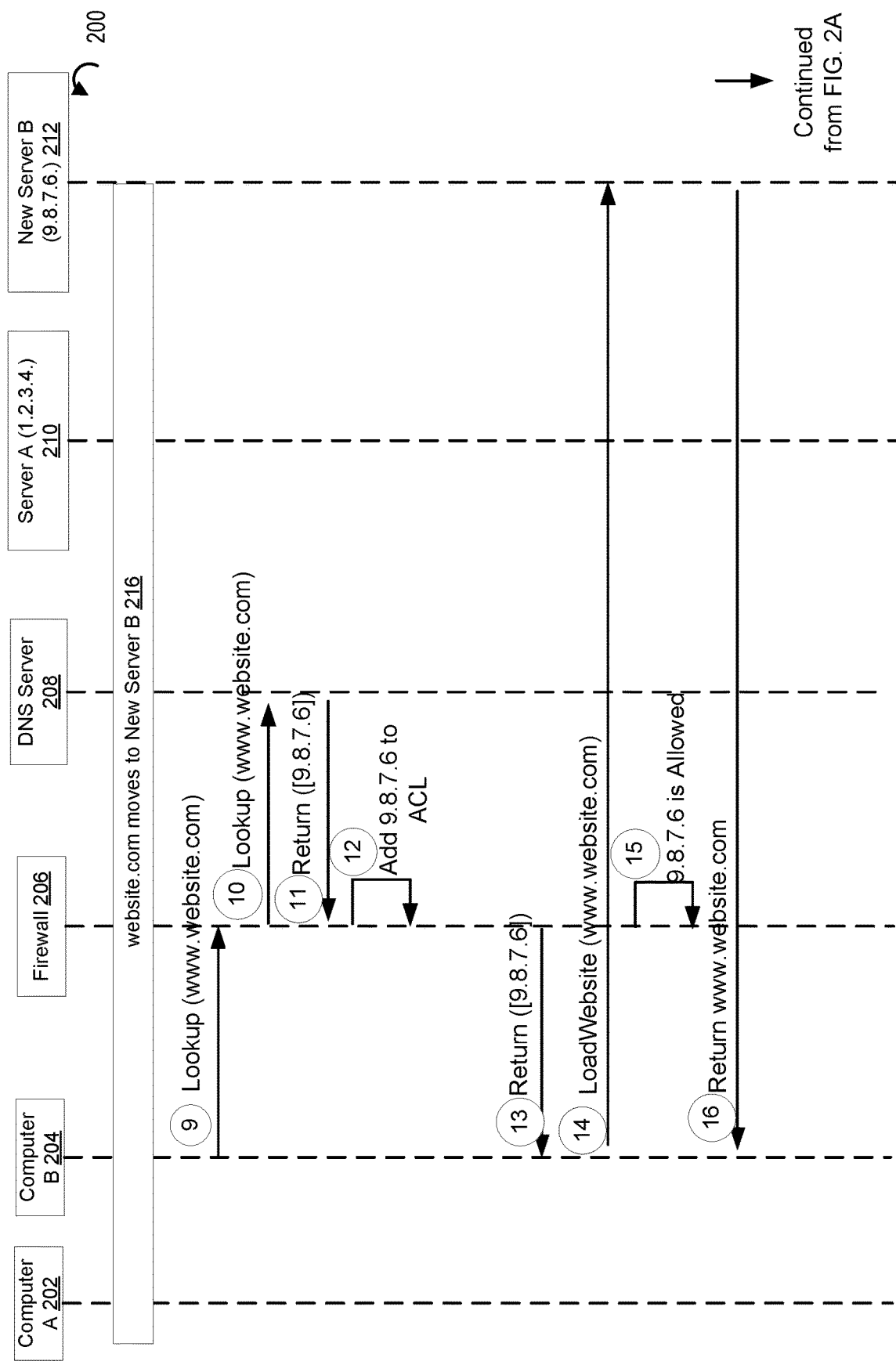
FIG. 2B illustrates an example swim lane diagram between computer systems and network devices for security policy features, in accordance with at least one embodiment.

The process of FIG. 2B includes, at step 12, the firewall 206 adding or otherwise updating the associated access control list to include or associate the IP address "9.8.7.6" with an approved IP address for the domain name "www.website.com." Swim lane diagram 200 of FIG. 2B depicts the firewall 206 transmitting a DNS response which includes the IP address "9.8.7.6" to computer B 204 at step 13. As computer B 204 has the IP address for the resource hosted by new server B 212, the process of FIG. 2B includes at step 14 computer B requesting access to "www.website.com" via a load or access request transmitted to new server B 212. This request at step 14 is obtained, accessed, or otherwise analyzed by firewall 206 at step 15 which determines that IP address "9.8.7.6" is included in the updated access control list and as such the request should be allowed or permitted to be transmitted to new server B 212. At step 16 the new server B 212 may return the web site or data objects for loading the web site "www.website.com." As illustrated by FIGS. 2A and 2B, the security policy features provide a solution for dynamically updating an access control list of a firewall by receiving and processing DNS requests and responses between devices of a network architecture. By updating the access control list the firewall can still allow requests to the resource associated with "www.website.com" despite migration between server A 210 and new server B 212 without having to make a separate cache update request to the DNS server 208 or the servers 210 or 212. Instead, the firewall 206 may actively update the associated access control list based on the received requests and responses which results in less down time for devices seeking to access the resource "www.website.com" even in situations where the resource is relocated.

Figure 3:
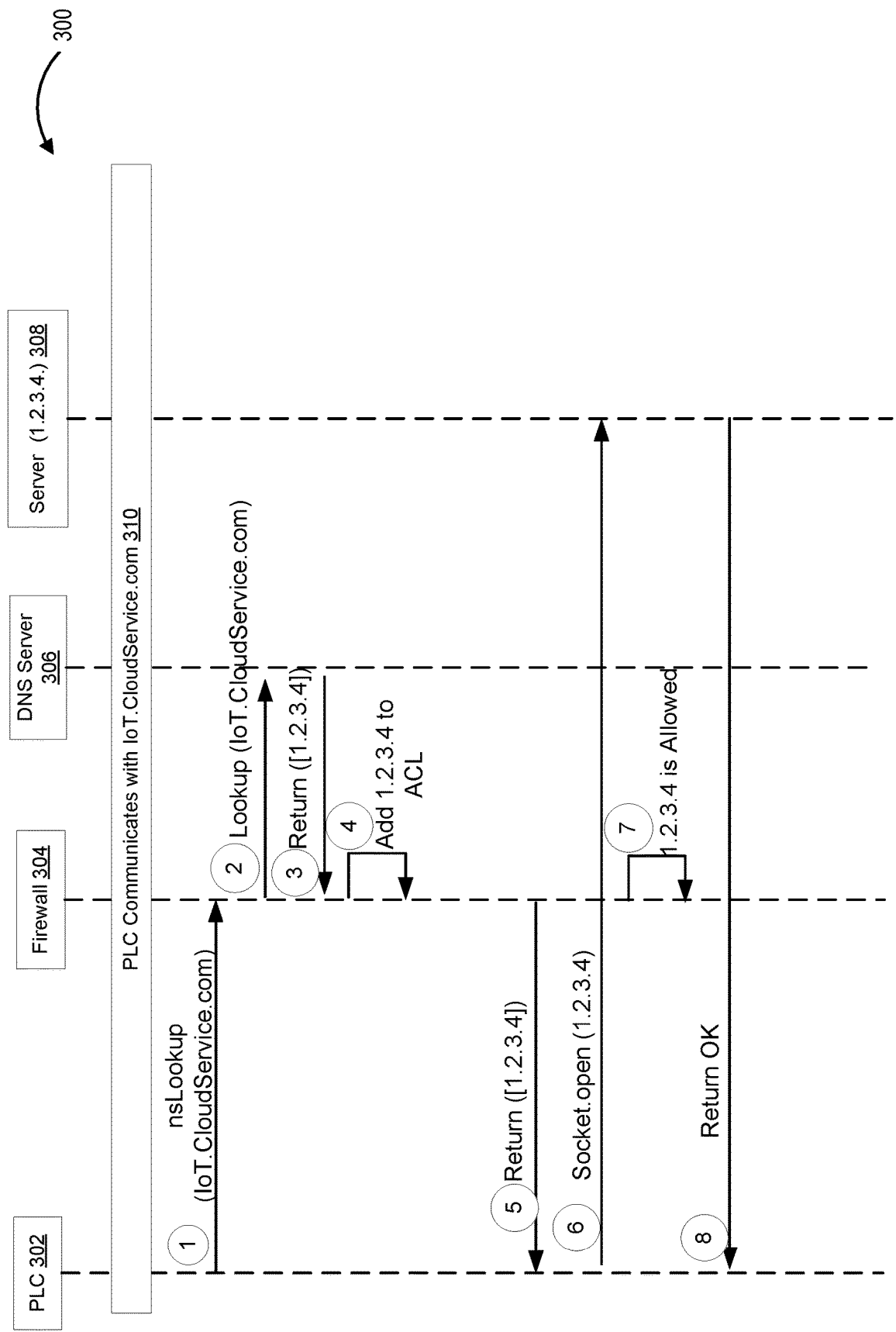
FIG. 3 illustrates an example swim lane diagram between computer systems and network devices for security policy features, in accordance with at least one embodiment.

FIG. 3 illustrates an example swim lane diagram 300 between computer systems and network devices for security policy features, in accordance with at least one embodiment. Although FIGS. 1A-2B describe embodiments of the security policy features for ensuring security and access between computer systems seeking to access a resource such as a web site, the embodiments included herein are not as limited. For example, the communication protocols utilized by devices implementing the security policies described herein are not limited to merely HTTP communication protocols. Instead, the features are communication protocol agnostic and can be utilized by devices using user datagram protocol (UDP), hypertext transfer protocol (HTTP), or transmission control protocol (TCP) as well as other communication protocols including proprietary protocols used by machine controller systems, programmable logic controllers, machine handling equipment, and associated electromechanical devices, as well as internet of things (IoT) devices. In embodiments, a machine controller system may be implemented as analog, digital, or mixed analog digital processing circuitry to direct the operation of an electromechanical system (electromechanical devices). An example of a machine controller system may be a programmable logic controller (PLC) or any suitable machine handling equipment that includes a real-time system which controls outputs that are required to be produced in response to control input conditions within a limited period of time or unintended operation of corresponding electromechanical devices or systems may occur. An electromechanical device may include sorting, packing, and label application lines, manufacturing and tooling lines, robotic assembly lines, as well as other suitable automated systems.

Swim lane diagram 300 of FIG. 3 includes PLC 302, firewall 304, DNS server 306, and server 308. In embodiments, server 308 may host one or more cloud service applications or services which PLC 302 is required to access in order to update data points or operate associated electromechanical devices of a facility. As illustrated in FIG. 3, the swim lane diagram 300 includes the PLC 302 attempting to communicate with a resource ("IoT.CloudService.com") hosted by server 308 at 310. Similar to the embodiment described with reference to FIGS. 2A and 2B, the firewall 304 of FIG. 3 may act as a relay server that directly receives access requests (DNS requests) from devices, such as PLC 302, and resolves such requests by communicating directly with DNS server 306. In embodiments, the firewall 304 may authenticate or may at some previous time period have authenticated DNS server 306. The authentication process between firewall 304 and DNS server 306 ensures that DNS requests, DNS responses, subsequent access requests and responses between a device and a server or other device, or associated information is not subject to man-in-the-middle attacks by a fraudulent actor. For example, were the firewall 304 to communicate with an untrusted DNS server (not pictured) and not perform an authentication process, a fraudulent actor posing as a legitimate DNS server could snoop information, alter information, or otherwise negatively impact a network architecture and associated devices. The firewall 304 may authenticate the DNS sever 306 via DNS sec or DNS hypertext transfer protocol methods or processes.

The swim lane diagram 300 of FIG. 3 includes the PLC 302 transmitting an access request at step 1 (e.g., "nsLookup (IoT.CloudService.com). The firewall 304 at step 2 may analyze the request to determine that a domain name in the access request (e.g., DNS request) of step 1 is included in an associated access control list. If the domain name is included in the access control list, the firewall 304 at step 2 may transmit the DNS request to DNS server 306. At step 3 of swim lane diagram 300, the firewall 304 may receive a DNS response from DNS server 306 which includes an IP address for the requested resource (e.g., IP address "1.2.3.4"). The firewall 304 may update an associated access control list at step 4 to include the received IP address "1.2.3.4" for domain name for the resource "IoT.CloudService.com." Upon updating the associated access control list, the firewall 304 may transmit a DNS response which includes the IP address to PLC 302 at step 5. At step 6 of swim lane diagram 300, the PLC 302 may transmit an access request (e.g., "Socket.open (1.2.3.4)) to server 308. As in other instances, the firewall 304 may determine if the access request is allowed by comparing the received IP address of the request to the IP addresses of the associated access control list at step 7. In swim lane diagram 300, the access request is allowed and at step 8 a return OK message is provided back to the PLC 302 by server 308 for accessing the service or application hosted by server 308.

Figure 4:
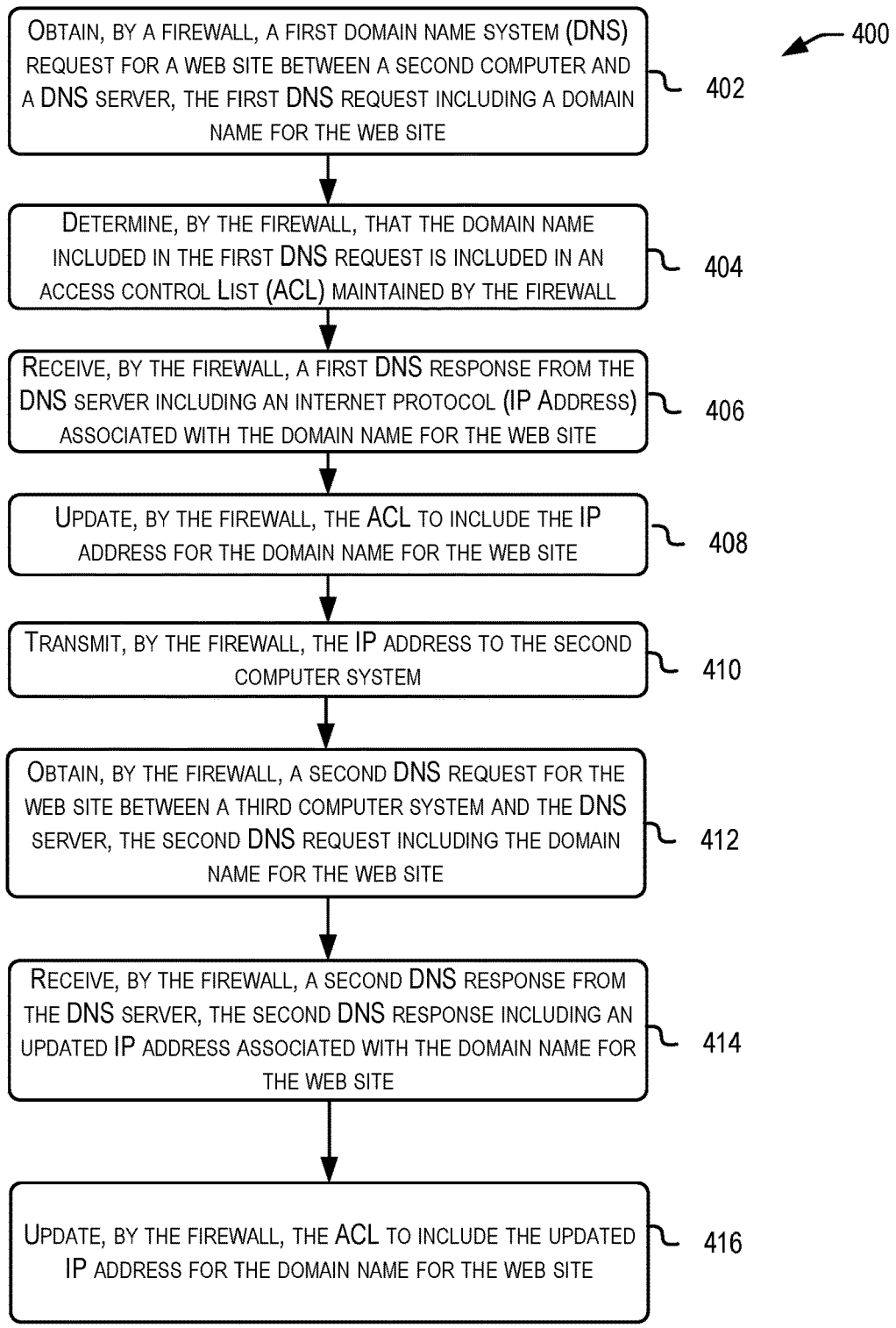
FIG. 4 illustrates an example flow chart for security policy features, in accordance with at least one embodiment.
Figure 5:
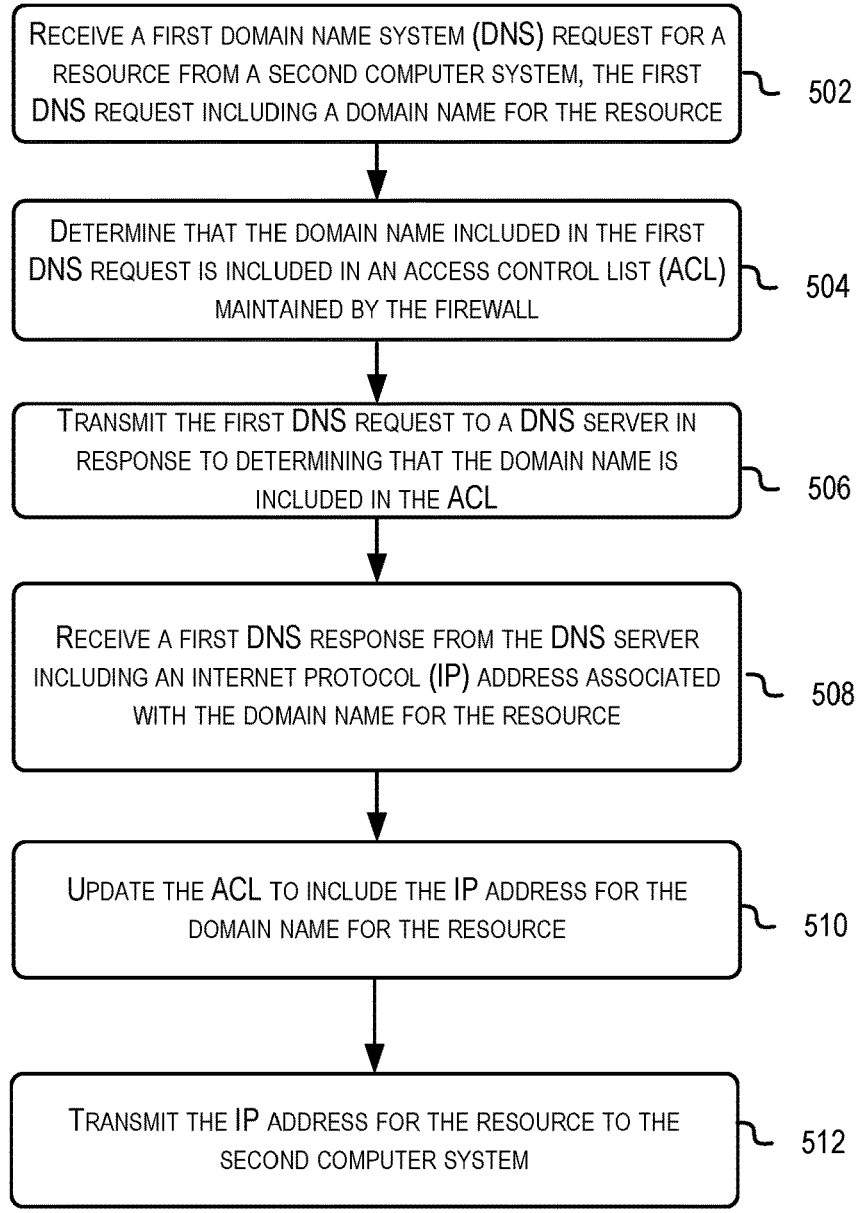
FIG. 5 illustrates an example flow chart for security policy features, in accordance with at least one embodiment.

FIGS. 4 and 5 illustrate example flow charts for boundary generation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory.

Figure 6:
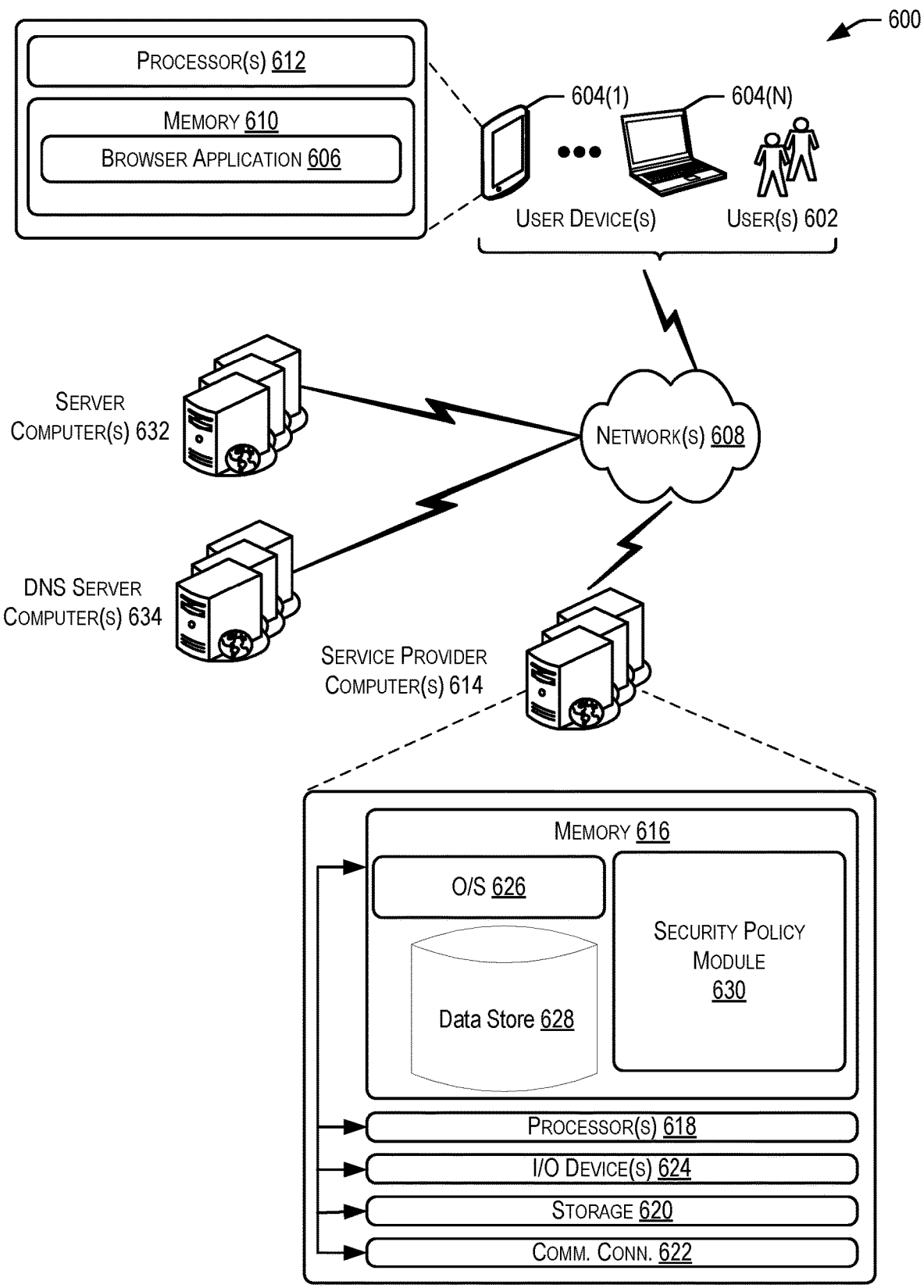
FIG. 6 illustrates an example architecture for security policy features that includes one or more service provider computer(s), user device(s), networks, server computer(s), and a domain name system (DNS) server computer(s), in accordance with at least one embodiment.

In some examples, service provider computers (service provider computers 614) utilizing at least the security policy module 630 depicted in FIG. 6 may perform the processes 400 and 500 of FIGS. 4 and 5. In FIG. 4, the process 400 includes obtaining, by a firewall (first computer system associated with, incorporating, or integrated with a firewall), a first domain name system (DNS) request for a web site between a second computer and a DNS server at 402. The first DNS request may include a domain name for the web site. The process 400 may include determining, by the firewall, that the domain name included in the first DNS request is included in an access control list (ACL) maintained by the firewall at 404. In embodiments, the firewall may maintain other security enforcement data objects, rules, or policies such as security policies as described herein. The process 400 may include receiving, by the firewall, a first DNS response from the DNS server that includes an internet protocol (IP) address associated with the domain name for the web site at 406.

The process 400 may include updating, by the firewall, the ACL to include the IP address for the domain name for the web site at 408. The process 400 may include transmitting, by the firewall, the IP address to the second computer system at 410. In embodiments, the firewall may receive a subsequent request, after transmitting the IP address to the second computer system, a request to load or retrieve the web site from using the IP address. The firewall may compare the IP address included in the web site load request to the IP address of the maintained ACL and either allow or deny the request. If the IP address of the web site load request (or resource load request) matches an IP address maintained by the firewall for the domain name then the request will be allowed, otherwise if it does not match—the request will be denied. The process 400 may include obtaining, by the firewall, a second DNS request for the web site between a third computer system and the DNS server at 412. The second DNS request may include the domain name for the web site.

The process 400 may include receiving, by the firewall, a second DNS response from the DNS server that includes an updated IP address associated with the domain name for the web site at 414. The process 400 may include updating, by the firewall, the ACL to include the updated IP address for the domain name for the web site at 416. In embodiments, the updated IP address may be transmitted, by the firewall, to the third computer system. In embodiments, the firewall (or associated computer system/service provider computers) may maintain and update a set of rules for associating certain domain names with certain priorities (e.g., a high priority or a low priority). IP addresses received by the firewall may be assigned a priority according to the rules and the domain name associated with each IP address. The priority assigned to a domain name and IP address pair can be used by the firewall to route load requests from computer system to web sites or resources associated with said domain name and IP address pair via particular ports which may be associated with higher bandwidth or network resources then other ports or network paths. In embodiments, the firewall may maintain certain rules or policies which identify certain network paths which are to be utilized for load requests (e.g., requests by a computer system to access a resource once identified via a DNS request and DNS response). For example, certain resource requests may be routed via particular network paths which may be associated with higher bandwidth based on the rules or policies.

The process 500 of FIG. 5 may include receiving, by a firewall, a first DNS request for a resource from a second computer system at 502. The first DNS request may include a domain name for the resource. The process 500 may include determining that the domain name included in the first DNS request is included in an ACL maintained by the firewall at 504. The process 500 may include transmitting the first DNS request to a DNS server in response to determining that the domain name is included in the ACL at 506. In embodiments, prior to transmitting the first DNS request to the DNS server, the firewall may authenticate the DNS server to establish a trust relationship and secure transmission of information between the firewall and the DNS server. For example, the firewall may utilize a DNS sec or DNS over hypertext transfer protocol process to authenticate the DNS server. If the DNS server is not properly authenticated then the first DNS request will not be communicated to the DNS server and an error message or notification of failure to authenticate may be transmitted by the firewall to the second computer system. The process 500 may include receiving a first DNS response from the DNS server including an IP address associated with the domain name for the resource at 508. The process 500 may include updating the ACL to include the IP address for the domain name for the resource at 510. The process 500 may include transmitting the IP address for the resource to the second computer system at 512. In embodiments, should the resource move to a different IP address the firewall can request an updated IP address, add it to the ACL, and provide the IP address to the requesting computer system to fulfill subsequent requests for access to the resource.

FIG. 6 illustrates an example architecture for security policy features that includes one or more service provider computer(s), user device(s), networks, server computer(s), and a domain name system (DNS) server computer(s), in accordance with at least one embodiment. In architecture 600, one or more users 602 (e.g., users, associates, etc.) may utilize user computing devices 604(1)-(N) (collectively, user devices 604) to access a browser application 606 or a user interface (UI) accessible through the browser application 606, via one or more networks 608 to request access to resources, applications, or perform operations in a facility or by interacting with another computer system via networks 608. The user device(s) 604 may include laptop computers, desktop computers, handheld devices, mobile devices, tablet computers, machine controller systems, programmable logic controllers, or associated electromechanical devices of the machine controller systems and programmable logic controllers. The "browser application" 706 can be any browser control or native application that can access and display a network page or other information such as a user interface of a native software application for enabling the communication or resource interaction or manipulation of a resource (e.g., another computer system) via networks 608. A native software application may include an application or program that has been developed for use on a particular platform (such as an operating system) or a particular device (such as a particular type of mobile device, machine controller system, programmable logic controller, or user device 604). In embodiments, the user device 604 may include one or more components for enabling the user 602 to interact with the browser application 606. In embodiments, the user device 604 may interact with the service provider computers 614 and other computer systems illustrated in FIG. 6 via networks 608 absent an interaction or request by user 602. Examples include automatic operations and requests made by machine controller systems and programmable logic controllers to electromechanical devices, servers, or other resources which do not require the input or activation by user 602 in order to perform operations and interact with resources via networks 608.

The user devices 604 may include at least one memory 610 and one or more processing units or processor(s) 612. The memory 610 may store program instructions that are loadable and executable on the processor(s) 612, as well as data generated during the execution of these programs. Depending on the configuration and type of the user devices 604, the memory 610 may be volatile (such as random access memory (RAM)) and/or non-volatile (such as read-only memory (ROM), flash memory, etc.). The user devices 604 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 604. In some implementations, the memory 610 may include multiple different types of memory, such as static random access memory (SRAM), dynamic random access memory (DRAM), or ROM.

Turning to the contents of the memory 610 in more detail, the memory 610 may include an operating system and one or more application programs or services for implementing the features disclosed herein. Additionally, the memory 610 may include one or more modules for implementing the features described herein including the security policy module 630.

The architecture 600 may also include one or more service provider computers 614 that may, in some examples, provide computing resources such as, but not limited to, client entities, low latency data storage, durable data store, data access, management, virtualization, hosted computing environment or "cloud-based" solutions, electronic content performance management, network security features including operation or integration of a firewall device, etc. In embodiments, the service provider computers 614 may be associated with a firewall or represent a firewall device itself. The service provider computers 614 may implement or be an example of the service provider computer(s) described herein with reference to FIGS. 1-5 and throughout the disclosure. The one or more service provider computers 614 may also be operable to provide site hosting, computer application development, and/or implementation platforms, combinations of the foregoing, or the like to the one or more users 602 via user devices 604.

In some examples, the networks 608 may include any one or a combination of many different types of networks, such as cable networks, the Internet, wireless networks, cellular networks, and other private and/or public networks. While the illustrated examples represents the users 602 communicating with the service provider computers 614 over the networks 608, to access a resource such as server computers 632, the described techniques may equally apply in instances where the users 602 interact with the one or more service provider computers 614 via the one or more user devices 604 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 614 may be any type of computing devices such as, but not limited to, a mobile phone, a smart phone, a personal digital assistant (PDA), a laptop computer, a desktop computer, a server computer, a thin-client device, a firewall, a network security device, a tablet PC, etc. Additionally, it should be noted that in some embodiments, the one or more service provider computers 614 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 614 may be in communication with the user device 604 via the networks 608, or via other network connections. The one or more service provider computers 614 may include one or more servers, perhaps arranged in a cluster or as individual servers not associated with one another. In embodiments, the one or more service provider computers 614 may be in communication with server computers 632 and DNS server computers 632 via networks 608.

In one illustrative configuration, the one or more service provider computers 614 may include at least one memory 616 and one or more processing units or processor(s) 618. The processor(s) 618 may be implemented as appropriate in hardware, computer-executable instructions, firmware, or combination thereof. Computer-executable instruction or firmware implementations of the processor(s) 618 may include computer-executable or machine-executable instructions written in any suitable programming language to perform the various functions described when executed by a hardware computing device, such as a processor. The memory 616 may store program instructions that are loadable and executable on the processor(s) 618, as well as data generated during the execution of these programs. Depending on the configuration and type of the one or more service provider computers 614, the memory 616 may be volatile (such as RAM) and/or non-volatile (such as ROM, flash memory, etc.). The one or more service provider computers 614 or servers may also include additional storage 620, which may include removable storage and/or non-removable storage. The additional storage 620 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 616 may include multiple different types of memory, such as SRAM, DRAM, or ROM.

The memory 616, the additional storage 620, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 616 and the additional storage 620 are all examples of non-transitory computer storage media. Additional types of non-transitory computer storage media that may be present in the one or more service provider computers 614 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 614. Combinations of any of the above should also be included within the scope of non-transitory computer-readable media.

The one or more service provider computers 614 may also contain communication connection interface(s) 622 that allow the one or more service provider computers 614 to communicate with a data store, another computing device or server, user terminals, and/or other devices on the networks 608. The one or more service provider computers 614 may also include I/O device(s) 624, such as a keyboard, a mouse, a pen, a voice input device, a touch input device, a display, speakers, a printer, etc.

Turning to the contents of the memory 616 in more detail, the memory 616 may include an operating system 626, one or more data stores 628, and/or one or more application programs or services for implementing the features disclosed herein including the security policy module 630. In embodiments, the service provider computers 614 and/or user devices 604 may be in communication with server computers 632 and DNS server computers 634 via networks 608. In accordance with at least one embodiment, the security policy module 630 may be configured to at least obtain, intercept, or otherwise access DNS requests between user device 604 and DNS server computers 634. The DNS requests may include a domain name for a resource such as a web site, application, electromechanical device, etc. In embodiments, the service provider computers 614 and security policy module 630 may be associated with or integrate a firewall which inspects, in-route, the DNS requests between computer devices accessing network 608.

The service provider computers 614 and security policy module 630 may be configured to determine whether the domain name included in the DNS request is allowed or disallowed in a maintained access control list, security policy, or other rules which identify particular domain names which are allowed access by which entities and which domain names are not allowed for access by certain entities. The security policy module 630 and service provider computers 614 may receive a DNS response from the DNS server computers 634 which includes an IP address associated with the domain name for the resource (e.g., server computers 632). The security policy module 630 may be configured to update the maintained access control list, security policy, or rules to include the IP address included in the DNS response. The IP address may then be transmitted, by the service provider computers 614 and security policy module 630 to the user device 604 via networks 608. In embodiments, subsequent DNS requests may be received, analyzed, and updates to the maintained access control list, security policy, or rules may be made by the security policy module 630. Should domain names which are not included in the access control list be obtained by the service provider computers 614, access to the resource, DNS response, etc., would be denied. In accordance with at least one embodiment, the service provider computers 614 and security policy module 630 may be configured to receive and process the DNS request from the user device 604 and make the request for the IP address to the DNS server computers 634 directly. In such embodiments, the service provider computers 614 and security policy module 630 may be configured to authenticate the DNS server computers 634 prior to transmitting any requests or processing responses for IP addresses associated with a requested domain name that is to be resolved by DNS server computers 634. In embodiments, the security policy module 630 may be configured to maintain and update priority rules for processing DNS requests and responses for certain resources at higher or lower priorities depending on the rules identifying such priorities. Certain network resources, such as ports or bandwidth usage may also be associated with certain domain names maintained by the security policy module 630 which enforces application of such ports or bandwidth usage restrictions by analyzing the rules or policies maintained by the service provider computers 614 and applying them to the domain names associated with said rules or policies when processing DNS requests/responses.

Figure 7:
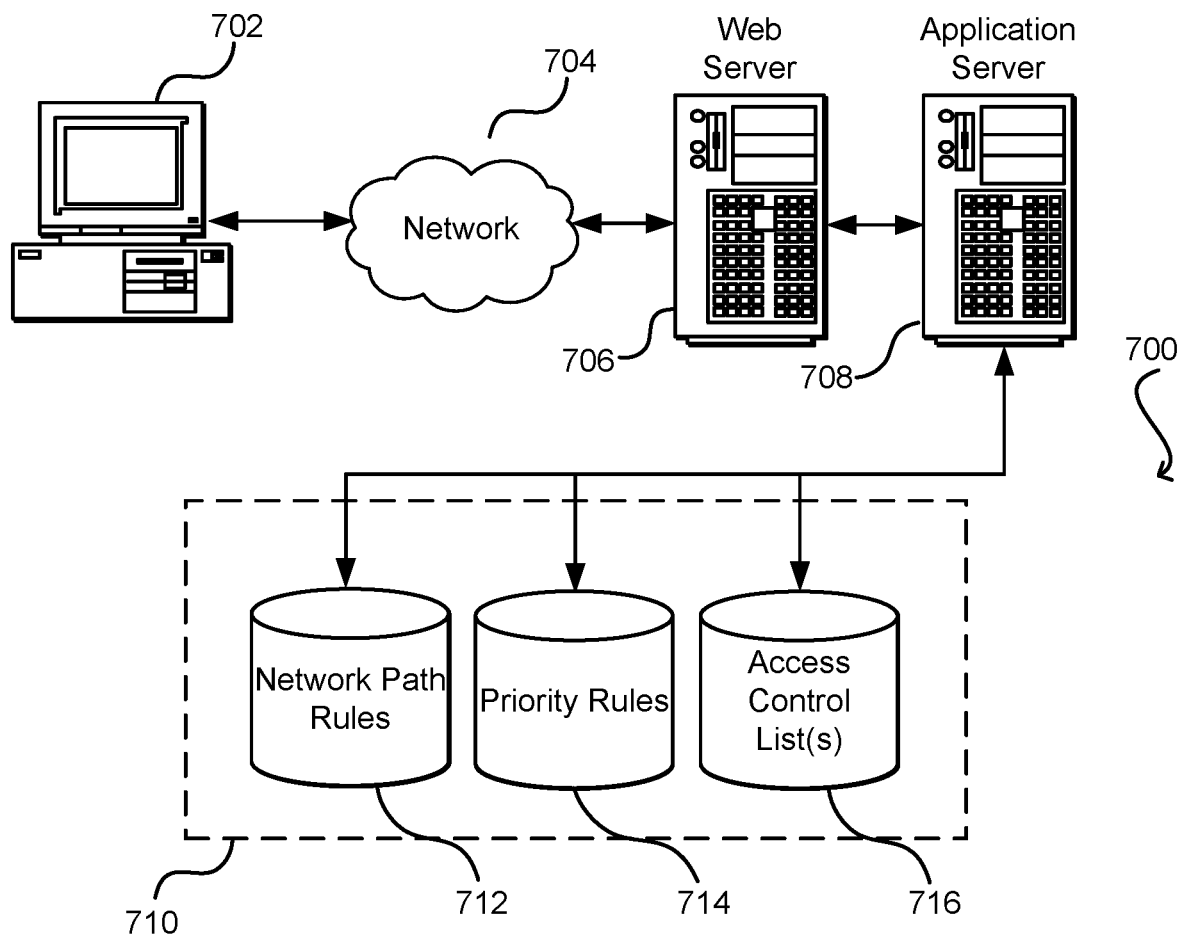
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing network path rules 712 and access control list(s) 716, which can be used to serve content for the production side as well as restrict, allow, resolve, and enforce access to resources via domain name requests and responses between devices accessing a network associated with the application server 708 and data store 710. The data store also is shown to include a mechanism for storing priority rules 714, which can be used for reporting, analysis, or other such purposes such as applying certain priority restrictions or benefits to certain domain names which are resolved by the application server 708 implementing the security policy features described herein. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a firewall of a first computer system, a first domain name system (DNS) request for a web site between a second computer system and a DNS server, the first DNS request including a domain name for the web site, each domain name comprising a plurality of associated IP addresses;
    determining, by the firewall of the first computer system, whether the domain name included in the first DNS request is included in an access control list maintained by the firewall;
    receiving, by the firewall of the first computer system, a first DNS response from the DNS server, the first DNS response including a plurality of internet protocol (IP) addresses associated with the domain name for the web site;
    upon receiving the first DNS response, updating, by the firewall of the first computer system, the access control list to include the plurality of IP addresses for the domain name for the web site in the plurality of associated IP addresses for the domain name for the web site;
    transmitting, by the firewall of the first computer system, the plurality of IP addresses to the second computer system;
    obtaining, by the firewall of the first computer system, a second DNS request for the web site between a third computer system and the DNS server, the second DNS request including the domain name for the web site;
    receiving, by the firewall of the first computer system, a second DNS response from the DNS server, the second DNS response including an updated TP address associated with the domain name for the web site; and
    upon receiving the second DNS response, updating, by the firewall of the first computer system, the access control list to include the updated IP address in the plurality of associated IP addresses for the domain name for the web site based at least in part on a result of the determination of whether the domain name included in the first DNS request is included in an access control list maintained by the firewall.

2. The computer-implemented method of claim 1, further comprising transmitting, by the firewall of the first computer system, the updated IP address to the third computer system.

3. The computer-implemented method of claim 1, further comprising maintaining, by the firewall of the first computer system, a set of rules that identify a particular priority for each domain name maintained by the access control list.

4. The computer-implemented method of claim 3, further comprising updating, by the firewall of the first computer system, the access control list to assign the particular priority for the plurality of IP addresses received from the DNS server.

5. The computer-implemented method of claim 4, further comprising routing, by the firewall of the first computer system, a load website request from the second computer system to the web site using an IP address of the plurality of IP addresses via a particular port associated with the particular priority as indicated by the updated access control list for the domain name.

6. The computer-implemented method of claim 5, further comprising determining, by the firewall of the first computer system, the particular port associated with the particular priority from a plurality of ports based at least in part on a type associated with the web site.

7. A non-transitory computer-readable storage medium storing computer-executable instructions that, when executed by a first computer system associated with a firewall, configure the firewall of the first computer system to perform operations comprising:
    obtaining a first domain name system (DNS) request for a resource between a second computer system and a DNS server, the first DNS request including a domain name for the resource, each domain name comprising a plurality of associated IP addresses;
    determining whether the domain name included in the first DNS request is included in an access control list maintained by the firewall;
    receiving a first DNS response from the DNS server, the first DNS response including a plurality of internet protocol (IP) addresses associated with the domain name for the resource;
    upon receiving the first DNS response, updating the access control list to include the plurality of IP addresses for the domain name for the resource in the plurality of associated IP addresses for the domain name for the resource based at least in part on a result of the determination of whether the domain name included in the first DNS request is included in an access control list maintained by the firewall; and
    transmitting the plurality of IP addresses to the second computer system.

8. The non-transitory computer-readable storage medium of claim 7, wherein the instructions, when executed by the first computer system, further configure the first computer system to maintain one or more rules that identify certain network paths to utilize when loading certain domain names of the access control list.

9. The non-transitory computer-readable storage medium of claim 8, wherein the instructions, when executed by the first computer system, further configure the first computer system to route a resource request for the resource using an IP address of the plurality of IP addresses to a certain network path of the certain network paths for the domain name as indicated in the access control list.

10. The non-transitory computer-readable storage medium of claim 7, wherein the instructions, when executed by the first computer system, further configure the first computer system to:
    receive instructions for updating domain names of the access control list by removing or adding certain domain names of the domain names of the access control list; and updating the access control list to update the domain names based at least in part on the instructions.

11. The non-transitory computer-readable storage medium of claim 7, wherein the instructions, when executed by the first computer system, further configure the first computer system to transmit a message, to the second computer system, denying access to the domain name for the resource in response to the domain name not being included in the access control list.

12. The non-transitory computer-readable storage medium of claim 7, wherein updating the access control list enables the firewall to permit access requests with the domain name after the resource has migrated to a different server having a different IP address.

13. The non-transitory computer-readable storage medium of claim 7, wherein the instructions further configure the firewall to, in response to determining that the domain name included in the first DNS request is included in an access control list maintained by the firewall, forward the first DNS request to the DNS server on behalf of the second computer system.

14. A first computer system comprising:
a memory configured to store computer-executable instructions; and
a processor in communication with the memory configured to execute the computer-executable instructions to at least:
receive, by a firewall of the first computer system, a first domain name system (DNS) request for a resource from a second computer system, the first DNS request including a domain name for the resource, each domain name comprising a plurality of associated IP addresses;
determine, by a firewall of the first computer system, whether the domain name included in the first DNS request is included in an access control list maintained by the firewall;
transmit, by a firewall of the first computer system, the first DNS request to a DNS server in response to determining that the domain name is included in the access control list;
receive, by a firewall of the first computer system, a first DNS response from the DNS server, the first DNS response including a plurality of internet protocol (IP) addresses associated with the domain name for the resource;
upon receiving the first DNS response, update, by a firewall of the first computer system, the access control list to include the plurality of TP addresses for the domain name for the resource in the plurality of associated IP addresses for the domain name for the resource based at least in part on a result of the determination of whether the domain name included in the first DNS request is included in an access control list maintained by the firewall; and
transmit, by a firewall of the first computer system, the plurality of IP addresses for the resource to the second computer system.

15. The computer system of claim 14, wherein the processor in communication with the memory is further configured to execute the computer-executable instructions to at least, prior to transmitting the first DNS request to the DNS server, authenticating the DNS server.

16. The computer system of claim 15, wherein the first computer system authenticates the DNS server using at least one of DNS sec or DNS over hypertext transfer protocol.

17. The computer system of claim 14, wherein the processor in communication with the memory is further configured to execute the computer-executable instructions to at least:
obtain a second DNS request for the resource from a third computer system, the second DNS request including the domain name for the resource;
receive a second DNS response from the DNS server, the second DNS response including an updated IP address associated with the domain name for the resource; and
update the access control list to include the updated IP address for the domain name for the resource; and
transmit the updated IP address to the third computer system.

18. The computer system of claim 14, wherein the resource includes one or more of a web site, a server, a cloud server, a cloud service or application, a machine handling equipment computer, a programmable logic controller (PLC), or an Internet of Things (IoT) device.

19. The computer system of claim 14, wherein the DNS request and the IP address are associated with one or more protocols, the one or more protocols including at least one of user datagram protocol (UDP), hypertext transfer protocol (HTTP), or transmission control protocol (TCP).

20. The computer system of claim 14, wherein the first DNS response from the DNS server further includes a time to live (TTL) time period associated with the IP address for the domain name and the resource, and wherein the TTL time period is transmitted to the second computer system with the IP address.

* * * * *